US007344146B2

(12) United States Patent
Taylor

(10) Patent No.: US 7,344,146 B2

(45) Date of Patent: Mar. 18, 2008

(54) QUADRACYCLE

(76) Inventor: William Gregory Taylor, 6612 Manor Hill Rd., San Antonio, TX (US) 78257

(*) Notice: Subject to any disclaimer, the term of this patent is extended or adjusted under 35 U.S.C. 154(b) by 343 days.

(21) Appl. No.: 11/196,390

(22) Filed: Aug. 4, 2005

(65) Prior Publication Data

US 2007/0052196 A1 Mar. 8, 2007

(51) Int. Cl.
*B62M 1/14* (2006.01)

(52) U.S. Cl. ...................... 280/246; 280/247; 280/248; 280/296; 280/250.1; 280/251; 280/242.1

(58) Field of Classification Search ................ 280/246, 280/247, 248, 296, 250.1, 251, 242.1
See application file for complete search history.

(56) References Cited

U.S. PATENT DOCUMENTS 1,058,123 A * 4/1913 Whitaker .................... 280/237
4,705,284 A * 11/1987 Stout ........................ 280/250.1
6,234,504 B1 * 5/2001 Taylor ...................... 280/250.1
6,715,780 B2 * 4/2004 Schaeffer et al. ........... 280/248
7,195,264 B2 * 3/2007 Drymalski .................. 280/246
2002/0101054 A1 * 8/2002 James ...................... 280/250.1
2002/0153691 A1 * 10/2002 Liao et al. ............... 280/250.1
2003/0071435 A1 * 4/2003 Schaeffer et al. ........... 280/248

* cited by examiner

*Primary Examiner*—Tony Winner
*Assistant Examiner*—Marlon Arce-Diaz
(74) *Attorney, Agent, or Firm*—Daniel Chapman LLD

(57) ABSTRACT

The improved wheelchair employs the use of two push levers attached to two forward drive gears, and two reverse drive gears, which propel the two main rear wheels of the chair through bicycle chains connecting the front drive gears to sprocket clusters mounted on the rear wheel axles. Direction control mechanisms allow the user to engage either forward or reverse drive gears, or disengage both, thereby producing forward, neutral, and reverse motion. Derailers are mounted behind each rear axle and are activated by shifter mechanisms mounted on the push levers. Disc brakes are mounted on the frame beside each wheel and activated by hand brake levers mounted on the push levers.

9 Claims, 15 Drawing Sheets

QUADRACYCLE

BACKGROUND OF THE INVENTION

1. Field of the Invention

This invention relates to a user-propelled vehicle or wheelchair. More particularly, it relates to a wheelchair propelled by push levers connected to drive wheels through bicycle chains and variable ratio rear gear clusters.

2. Description of the Prior Art

Most wheelchair users have little or no functional use of their lower extremities, but have preserved normal upper body function. Accordingly, the conventional wheelchair requires the user to propel the chair by repetitively pushing on push-rims attached to the main wheels of the chair. The arm and shoulder motions that are required are undesirable because they utilize the small, relatively weak, muscles of the rotator cuff and ultimately lead to stress injury and degenerative arthritis of the shoulder joint. This is also an inefficient means of locomotion; providing only a one-to-one ratio of distance traveled for distanced pushed. It is, however, an ubiquitous and relatively simple machine that can be easily maintained. Several attempts have been made to improve on this standard with very limited success.

Several inventions employ the use of levers for the user to propel the chair. This is an improvement because it makes use of the larger and more powerful triceps and pectoral muscles, with reduced shoulder stress. Still, however, all of these devices have fallen short of success.

For example, U.S. Pat. No. 4,865,344 provides only one speed having one fixed gear ratio, and thereby forgoes the significant mechanical advantage gained by using a set of multiple gear ratios. This machine also requires the user to steer with hand levers attached to the push levers, increasing the complexity of steering and propulsion movements.

U.S. Pat. No. 5,322,312 is another attempt to propel a wheelchair with a push lever. It also lacks sufficient mechanical advantage, having only one gear ratio. The use of a detachable skateboard device makes this machine unnecessarily complex, expensive, and difficult to maintain.

U.S. Pat. No. 5,209,506 is cumbersome in requiring the user to steer with handlebars which are simultaneously pushed and pulled to propel the chair. The linkage required to operate this machine is also too complex for easy care, and the position of the steering/push lever obstructs easy entry and exit of the chair.

U.S. Pat. No. 4,811,964 also uses push levers for power, but in a rowing motion. This machine would be difficult to steer, having a combined row-steer motion; it also has only one speed, and uses a complex system of pulleys and linkage, all of which serve to make it impractical.

U.S. Pat. No. 3,994,509 is another lever-driven machine that makes use of a very complex and expensive system of forward and reverse clutches. It also provides only a single forward speed, and has a very wide profile, to accommodate the wide-set wheels. There are several inventions that use a set of bicycle pedals to turn a crank which, in turn, transfers power via a bicycle chain to either front or rear wheels. All of these hand-crank designs suffer from the fact that the hand cranking motion is extremely fatiguing. Further, they are too big and too heavy. The cranking/steering device obstructs entry and exit. These wheelchairs generally lack multiple gears and are difficult to steer while cranking.

U.S. Pat. No. 4,720,117 is a typical example of this type of machine.

U.S. Pat. No. 5,362,081 is an attempt to adapt the mechanical advantage of multiple gear ratios to the standard wheelchair format. It does not, however, save the user from the repetitive motion injury and degenerative damage to the shoulder joints; and, in requiring the use of the user smaller, weaker rotator cuff muscles, it is more fatiguing than a push lever driven machine. This particular model also requires the user to let go of the steering/drive wheel to shift gears.

There are designs that use a system of levers and gears to propel the chair, but none of them have all the combined advantages that my invention offers.

Some of those (U.S. Pat. Nos. 6,276,703; 6,557,879; 6,764,089) put the user in a very low position, almost recumbent. This is an impractical position for daily use because of the difficulty in getting down onto the chair and up out of the chair. It also places the user too low to interact with their environment and other people. These frames are only useful in sporting events.

Some of these designs (U.S. Pat. Nos. 5,632,499; 6,173,986; 4,560,181; 6,371,502; 6,715,780) utilize systems that derive power from both pushing and pulling the hand levers. These use various mechanical methods and machinery to provide forward propulsion on both push and pull strokes. The function of pulling on the levers under load to propel the chair is very non-ergonomic; and is only useful for very short periods at very low power.

It is clear to see that a "pushing" motion allows the user to make use of a rigid back rest for passive resistance to the power stroke. This is not possible with the "pulling" motion.

Since wheelchair users have no leg strength, the user must utilize all abdominal muscles and back muscles to stabilize his trunk for each "pulling" motion. This is extremely fatiguing and highly impractical for prolonged mobility.

Some of these designs (U.S. Pat. Nos. 6,820,885; 4,560,181; 6,371,502; 6,557,879; 6,276,703) utilize a variable lever arm length to obtain their version of "gearing". This is not true gearing, but can provide a differing angular distance of wheel movement with a fixed distance of arm movement. However, the range of this variation is quite limited; and the designers do not take into account the difference in the angular speed of the wheel and how difficult it is to keep up with faster arm motions. Functionally these become single-speed chairs.

Some of these designs (U.S. Pat. Nos. 6,715,780; 6,557,879; 6,276,703) use a wheel hub with internal gears. This is a usable gearing system designed for bicycles over 50 years ago. It has recently been revived in the bicycle world, because the delicate moving parts are all enclosed and protected from the major trauma that mountain bikes regularly encounter. Derailers on mountain bikes have a very short life cycle. These internal gear hubs function in only one orientation, i.e. with the drive chain on the right side as done by U.S. Pat. No. 6,715,780. It is not clear that the other two patents that cite use of an internal drive hub can actually function. Although it is possible to manufacture such a hub that is a complete mirror-image of the standard hub, this is not currently being done nor likely ever will be. The derailer is still superior for a road machine due to its simplicity, lighter weight and greater range of gear ratios.

One design (U.S. Pat. No. 6,674,089) does utilize a derailer for its gearing system. It drives a single rear axle with either one or two wheels, and cannot use these wheels for steering, but must rely on front wheel rotation for steering.

Applicant's previous patent (U.S. Pat. No. 6,234,504) is similar to the current design, with some minor changes, primarily in the reverse function.

Several designs have indicated the use of various braking systems, all of which are obvious and analogous and interchangeable with any other design. The disc brake is not inherently superior nor novel, however it is easy to use with the brake lever set near the user's hand and the braking mechanism is set in a more protected place on the chair making it less likely to be traumatized by the environment.

Some designs indicate differing number and configuration of wheels, shock absorbers, seating material that really have nothing to do with the propulsion mechanism and user needs.

OBJECTIVE OF THE INVENTION

It is the object of this invention to provide for, in a wheelchair of simple construction, an alternative means for manually powering the wheelchair which utilizes the strong shoulder and arm muscles of the wheelchair occupant while providing for a selection of gear options to drive the wheelchair in a forward or reverse motion.

SUMMARY OF THE INVENTION

Applicant provides for a wheelchair propulsion apparatus that improves a user's ability to propel a chair with less effort and greater speed over a longer duration. Compared to present wheelchair options, mechanics used in Applicant's wheelchair decrease the stress on shoulder joints and diminish the degenerative joint disease often accompanying prolonged wheelchair use.

Applicant's wheelchair is propelled through use of two push levers, which the user pushes forward utilizing triceps and pectoralis muscles. Each lever is attached to a front drive axle fitted with two drive gears, one for forward motion and one for reverse motion. Power is transmitted from the drive gears to the rear wheels through bicycle chains and multi-speed sprockets attached to the rear wheel axles. Multiple gear ratios are made possible by shifting the drive chain to different size rear wheel sprockets with a derailer mechanism.

Turning is accomplished in the same manner that is done with a standard wheelchair. One wheel is pushed more than the other, or a braking force is applied to one wheel while the other is pushed. Braking is accomplished effectively by using caliper or disc brakes similar to those used on a typical bicycle.

Reverse locomotion is achieved by shifting the direction selectors into reverse, allowing the reverse drive gear to transmit power through a separate bicycle chain to the reverse drive sprocket mounted on the rear axle.

This apparatus provides for a most efficient means of wheelchair propulsion, with significant physiological benefits to the user.

DETAILED DESCRIPTION OF THE INVENTION

Figure 1:
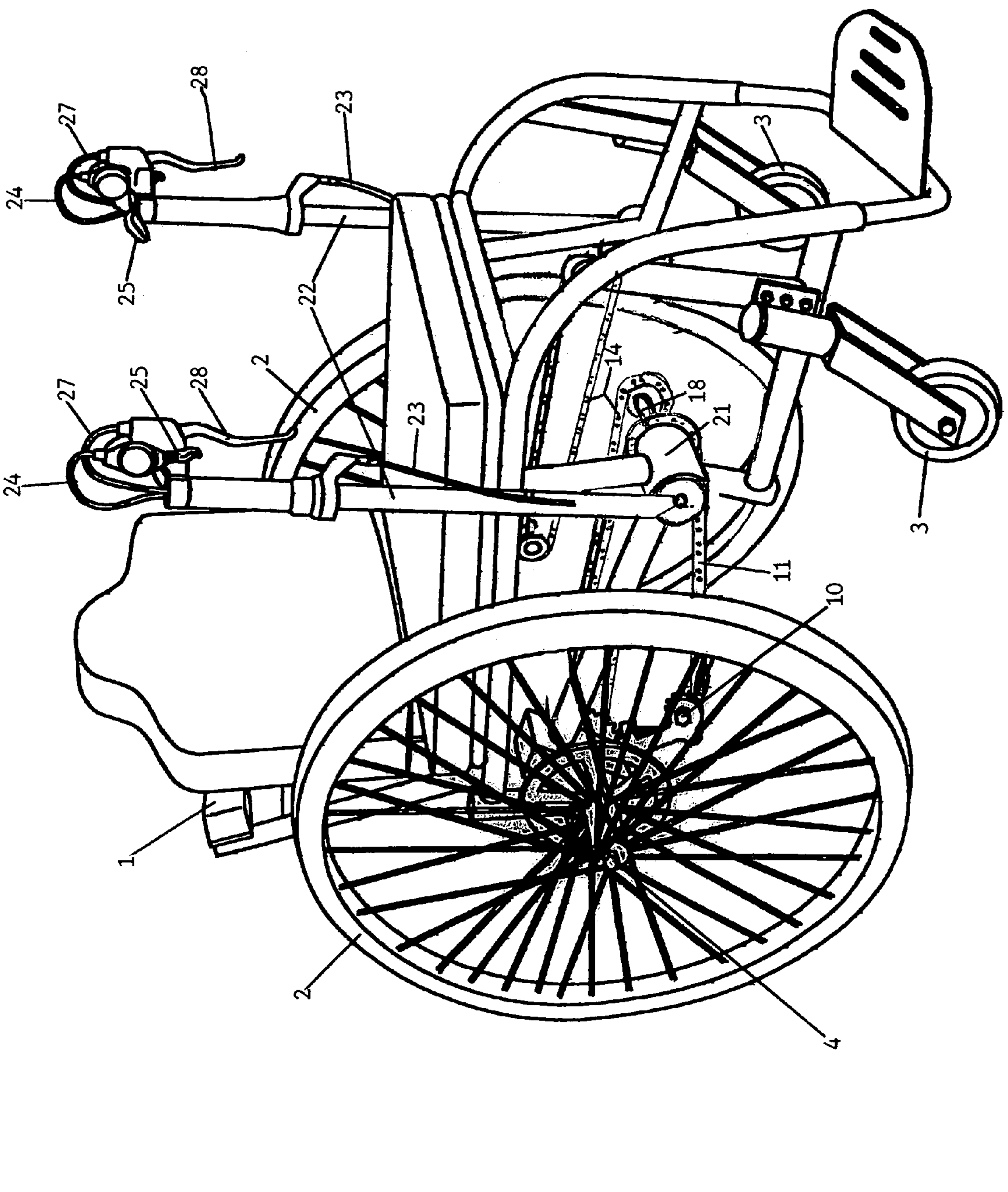
FIG. 1 is a right side view in elevation of the apparatus of this invention.
Figure 2A:
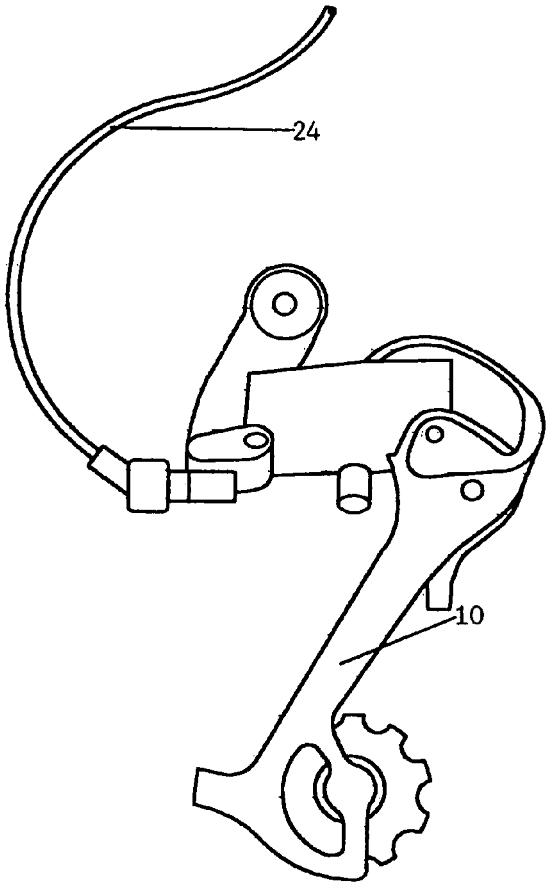
FIG. 2 is a view of left and right derailers showing them to be mirror images of each other.
Figure 2B:
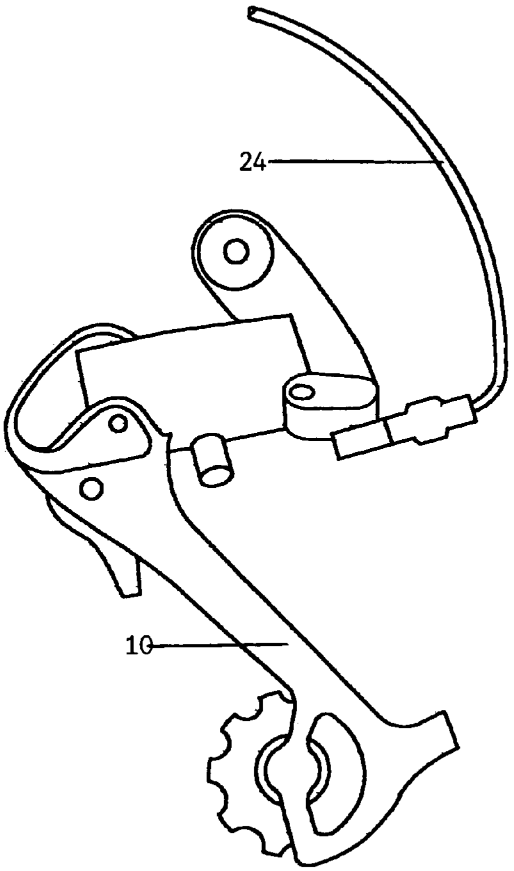
Figure 3A:
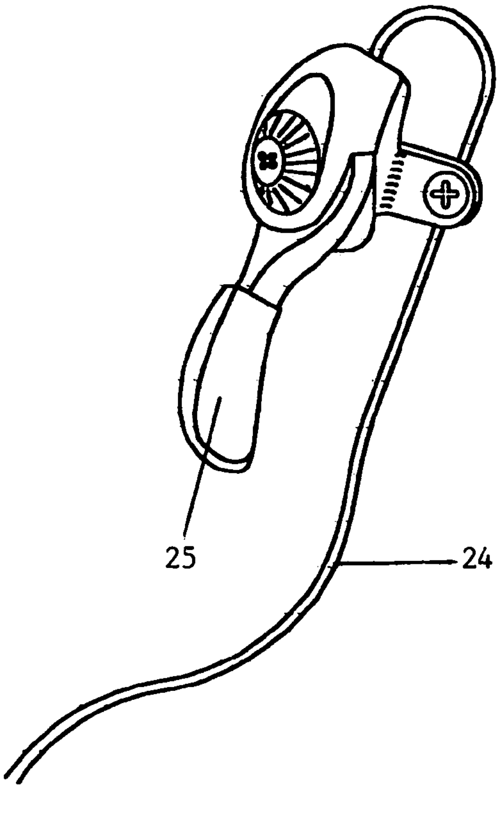
FIG. 3 is a view of left and right shifters showing them to be mirror images of each other.
Figure 3B:
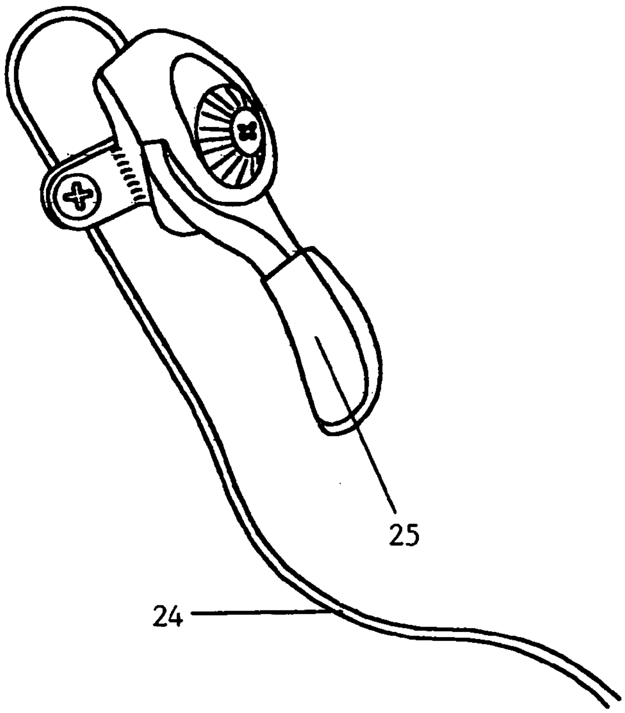
Figure 4:
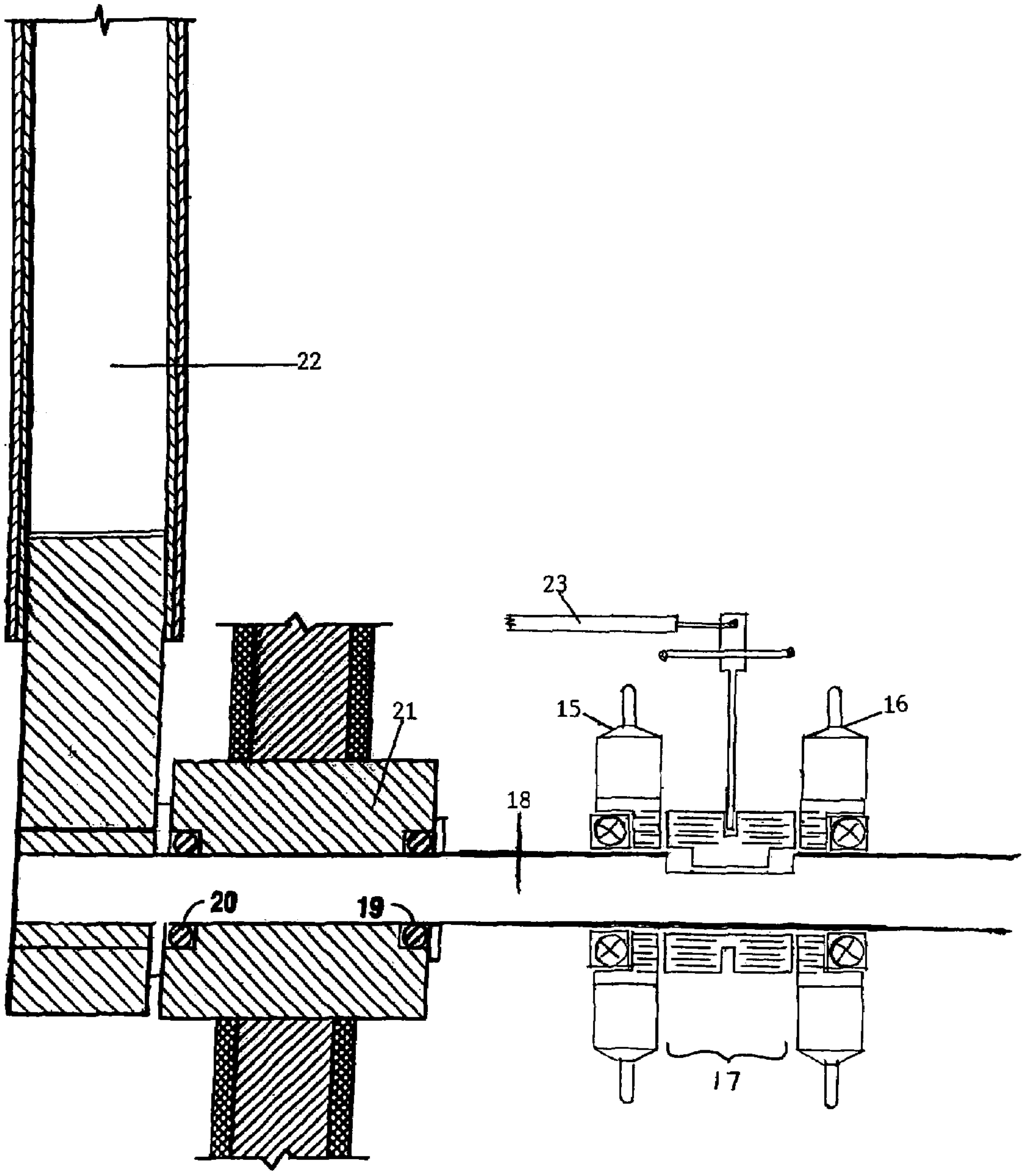
FIG. 4 is a cross section view of the front axle with its attached push lever, hub, bearings, forward and reverse drive gears, and directional selector mechanism.

With reference to FIGS. (1,9) it is seen that wheelchair (1) has two large rear wheels (2) and two smaller front casters (3). The large rear wheels are typically mounted outboard of the wheelchair frame on rear axles (4). These rear axles are typically mounted in the left and right rear axle hubs (5) which are incorporated in the frame of the chair on the left and right rear frame uprights (6) below the level of the seat. The axles are supported in the hubs on inner (7) and outer (8) axle bearings. The rear wheels typically are attached to the axles such that each wheel and axle turns as a unit on the hub bearing. Inboard of the left and right rear axle hubs, sprocket clusters (9) are affixed to their respective axles, and turn with the wheel and axle as a unit.

The specific number of sprockets in each cluster, and the specific number of teeth on each sprocket can be varied within the limitations of space and axle length.

Figure 5:
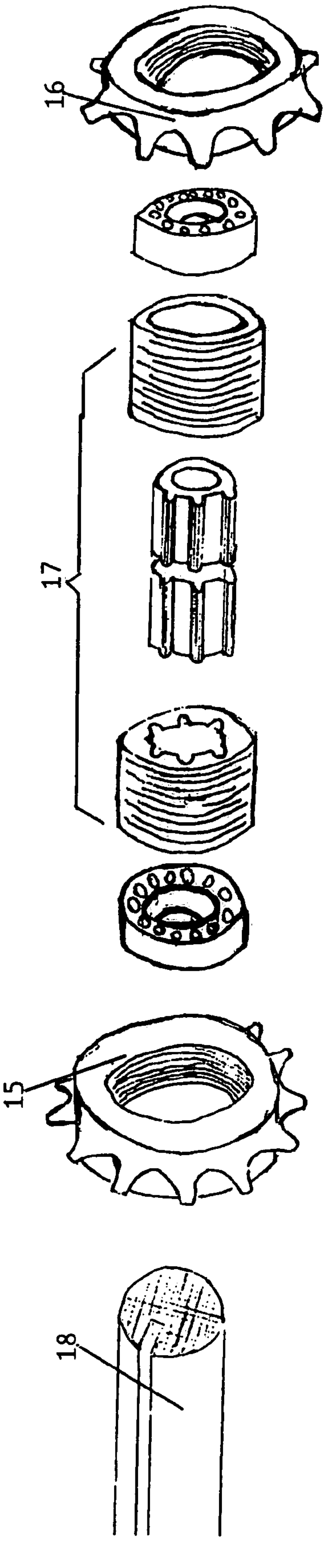
FIG. 5 is an expanded view of the directional selector mechanism showing the gears, bearings, and selector.
Figure 6:
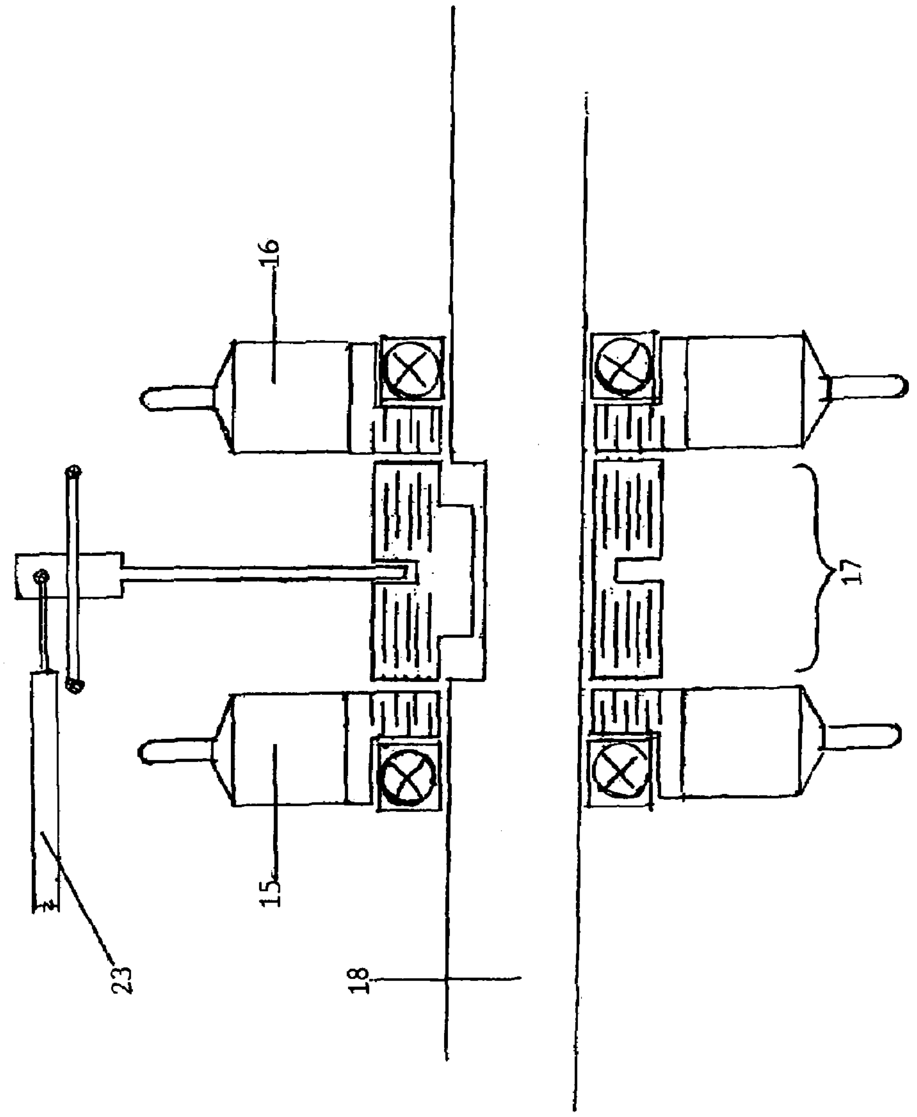
FIG. 6 is a cross sectional view of the directional selector mechanism, front axle, and drive gears, with the selector in the neutral position.
Figure 7:
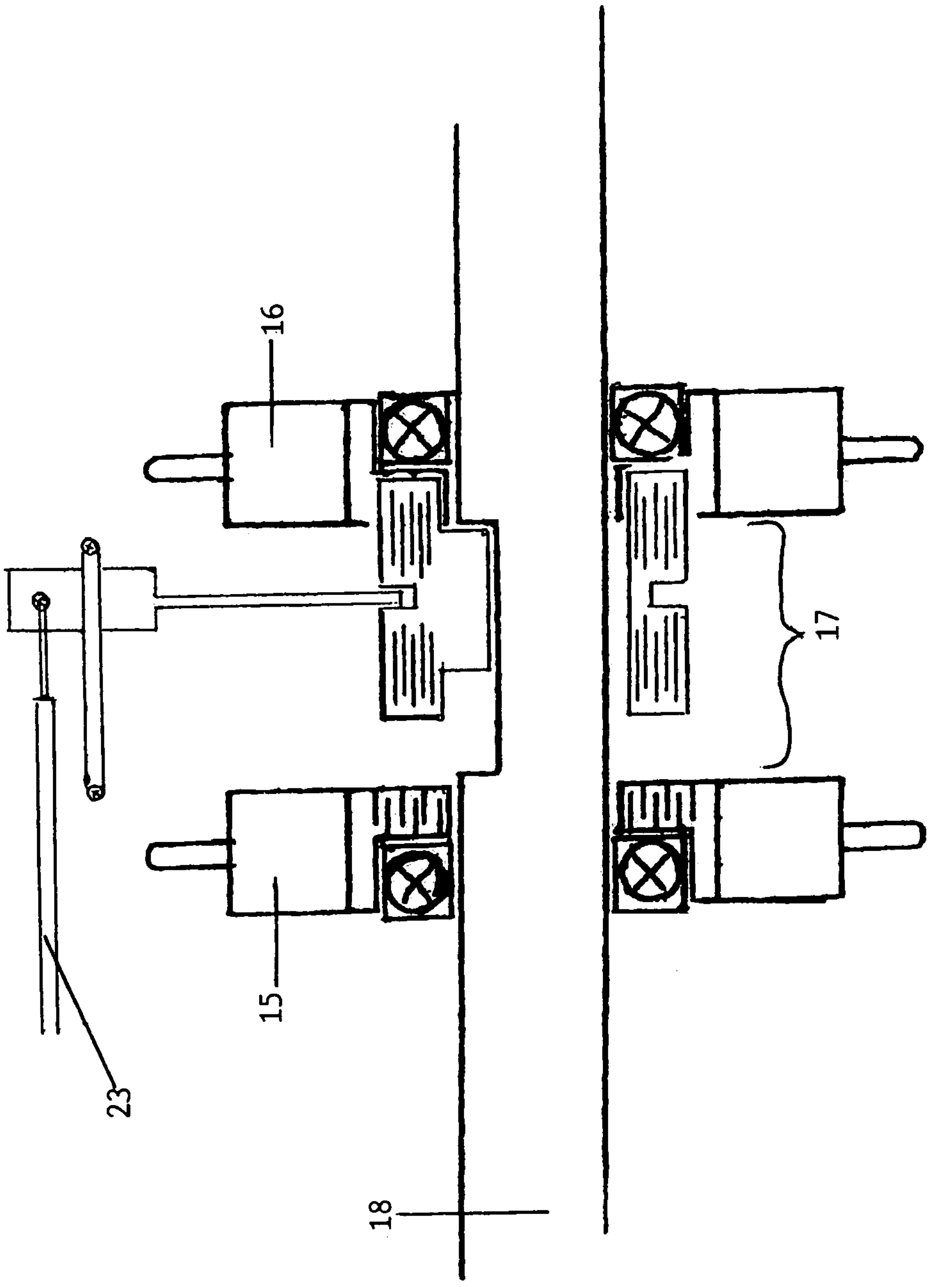
FIG. 7 is a cross sectional view of the directional selector mechanism, front axle, and drive gears, with the selector in the forward drive position.
Figure 8:
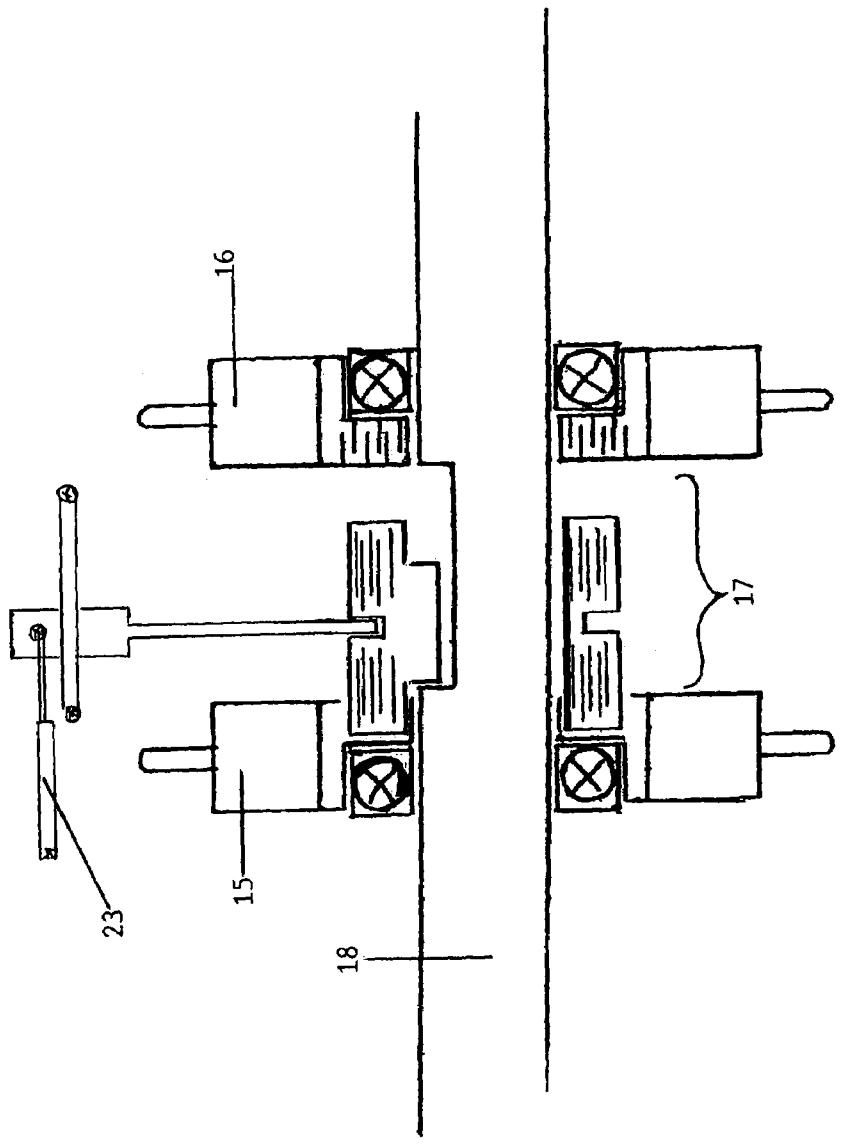
FIG. 8 is a cross sectional view of the directional selector mechanism, front axle, and drive gears, with the selector in the reverse drive position.
Figure 9:
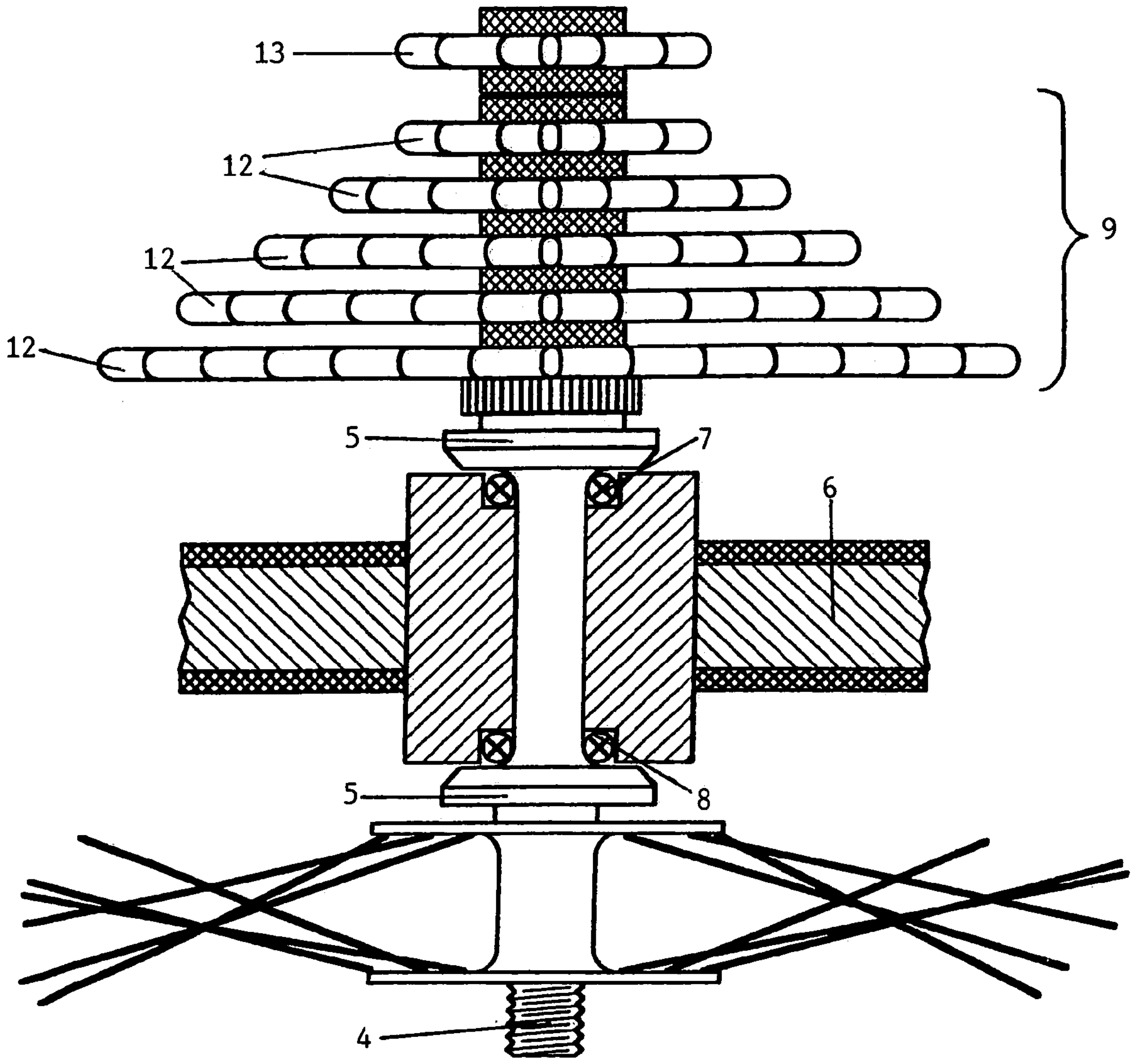
FIG. 9 is a cross section view of the rear axle with its bearings, hub, frame upright, wheel, and sprocket cluster.
Figure 10:
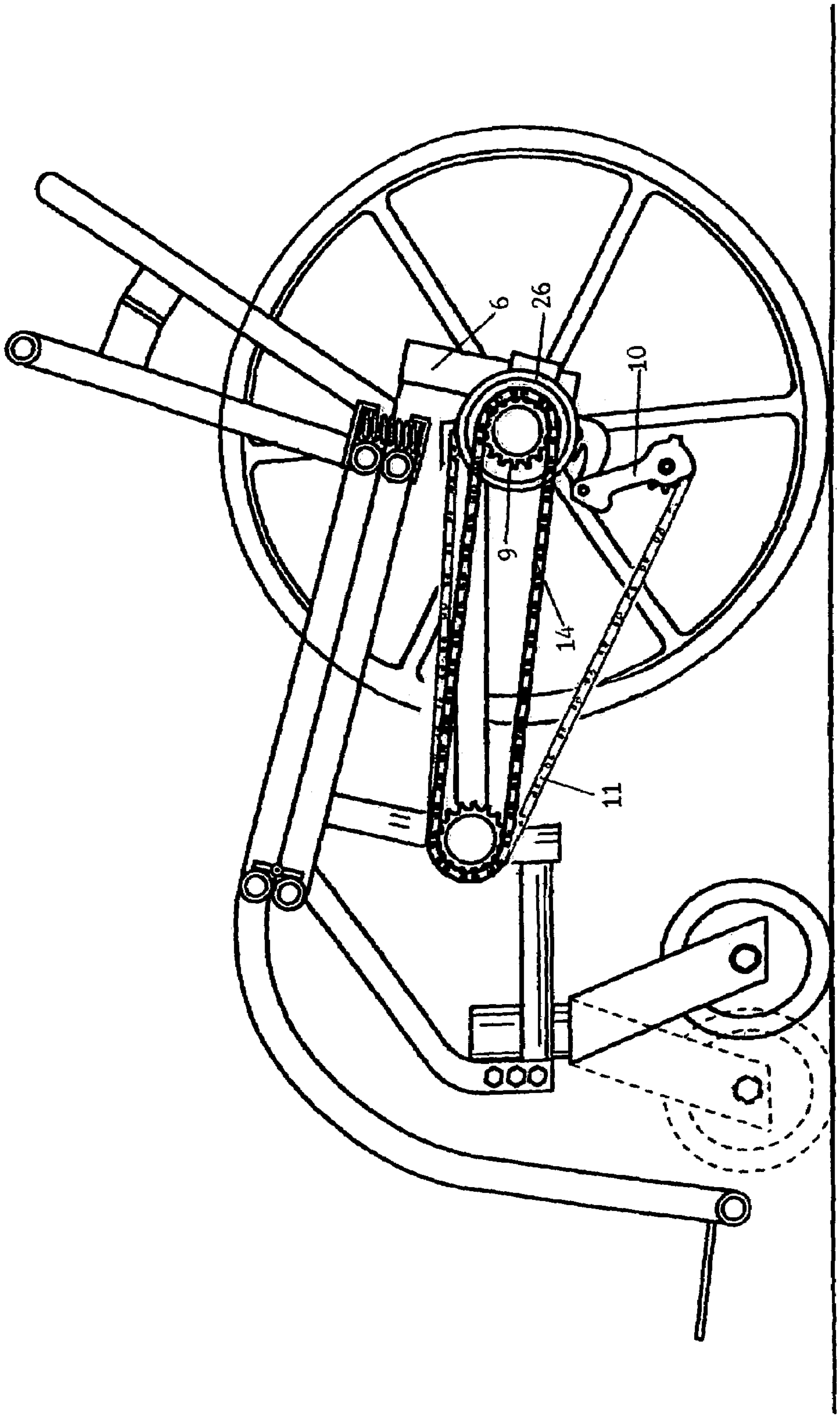
FIG. 10 is a view of the right side of the chair viewed from the center of the chair, showing the two bicycle chains on dedicated forward and reverse drive gears, and showing the two bicycle chains on respective rear axle sprockets.

With further reference to FIG. 1 derailers (10) are seen attached to the frame below the left and right forward drive clusters to shift the left and right forward drive chains (11) between the sprockets (12) on each forward drive cluster (9). The sprocket (13) on the inboard end of the cluster is the dedicated reverse sprocket. Each of the forward drive chains (11) and reverse drive chains (14) are multi-link, standard bicycle chains that rotate their respective sprockets (and axle and wheel) when the corresponding front axle drive gear (15, 16), FIG.(4,6,7,8), is engaged by the direction selector mechanism (17) FIG. 5 and rotated by the user.

With further reference to FIG. (4,5,6,7,8) it is seen that each forward drive gear (15) and reverse drive gear (16) and directional selector (17) are mounted on the front drive axle (18) which is supported on inner (19) and outer (20) bearings, in its front axle hub (21). The left and right front hubs are typically fixed to the frame of the chair below the seat level. Outboard of the chair frame, push-pull levers (22) are attached to each front drive axle.

Figure 11A:
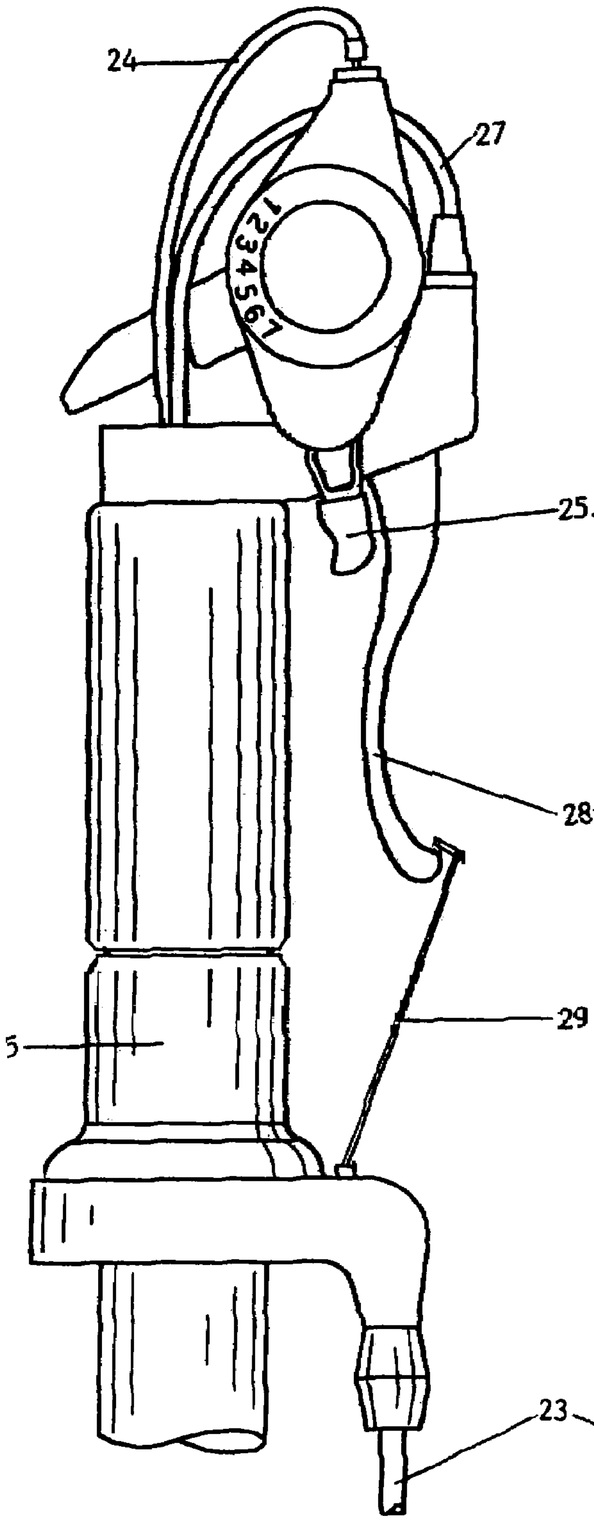
FIG. 11 is a view of the upper end of the right and left push levers showing the shifters, and brake levers, brake lever retaining clips, and the rotating grip shifters with direction selector cables.
Figure 11B:
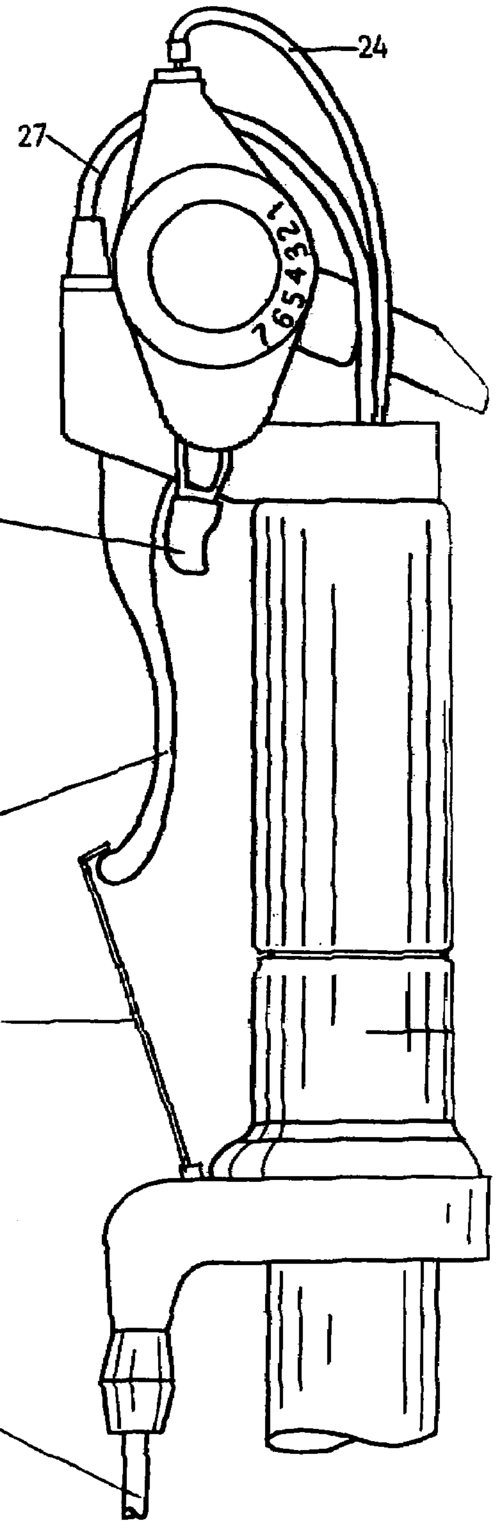

With further reference to FIGS. (4,5,6,7,8) it is seen that the push-pull lever can deliver a power stroke in either the clockwise or counterclockwise direction depending upon which drive gear has been engaged by the direction selector mechanism (17). The position of the direction selector mechanism is determined by the grip shifter, (35), FIG. 11, at the upper end of the push-pull lever (22). Rotation of the hand grip in one direction moves the selector cable (23) setting the direction selector mechanism to engage one of the drive gears, whereas rotation of the hand grip in the opposite direction will cause the directional selector mechanism to engage the other drive gear; and rotating the hand grip to a position midway between extremes will disengage both drive gears.

Figure 12:
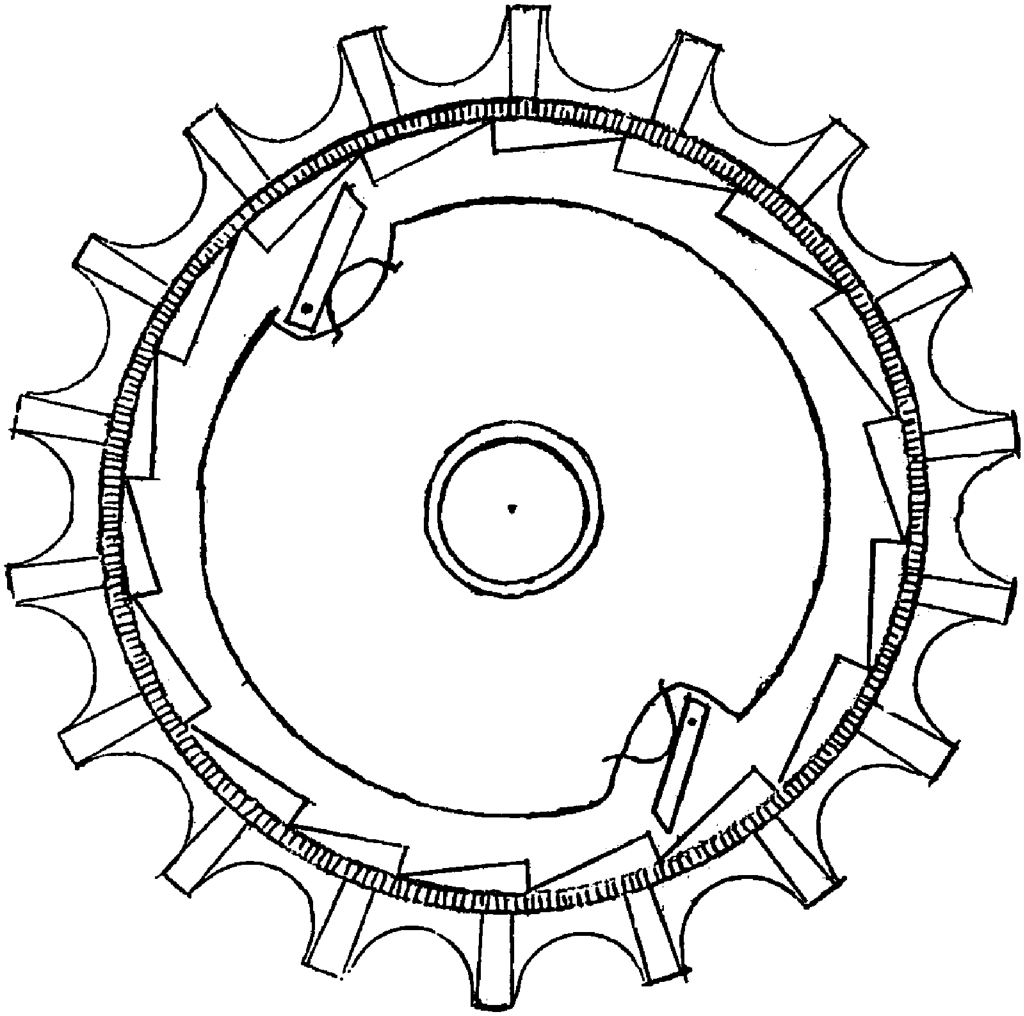
FIG. 12 is a transparent view of one of the front axle drive gears showing the internal system of palls that permit power transmission in one direction only and ratcheting in the opposite direction.
Figure 13:
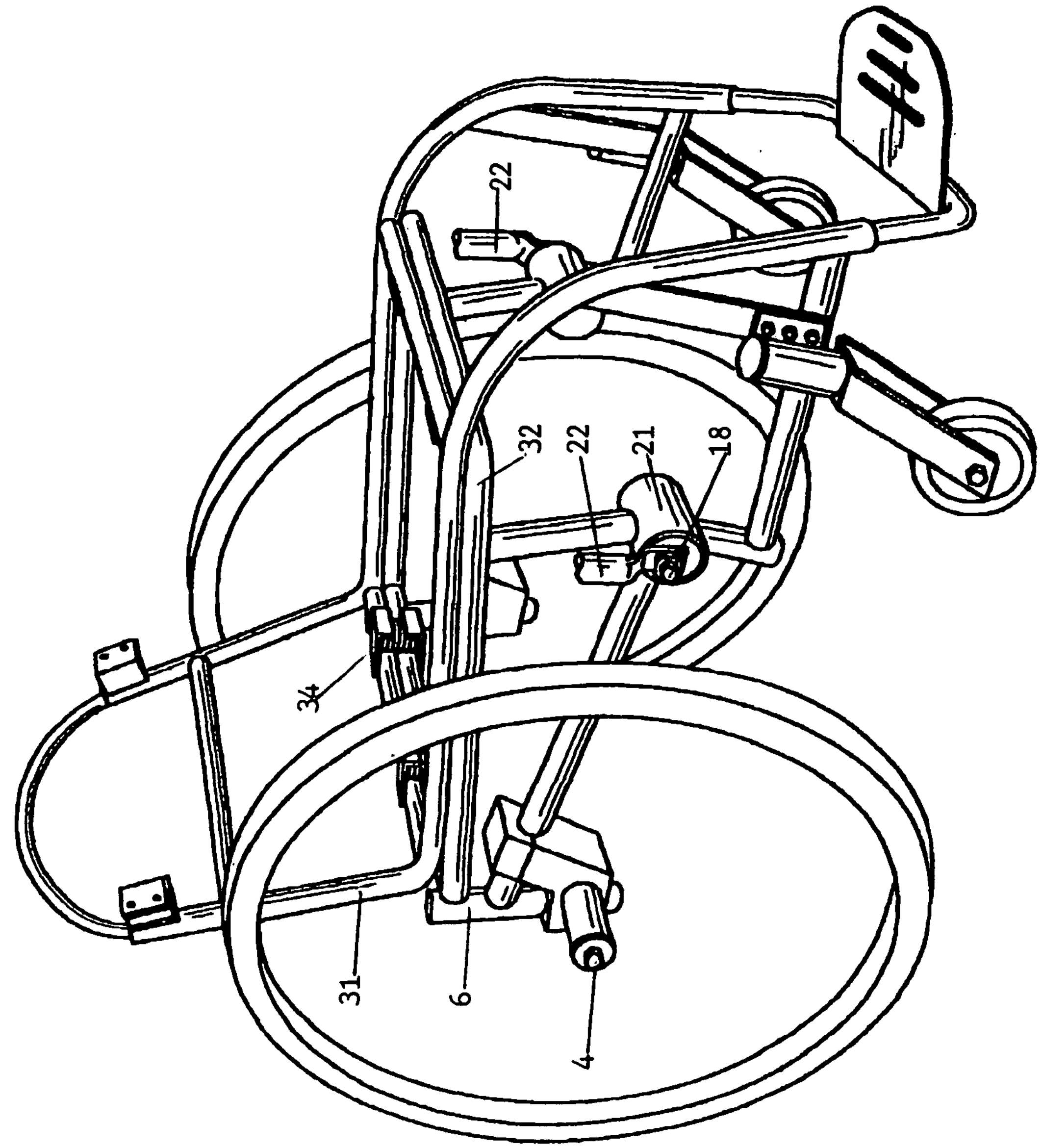
FIG. 13 is a right side view of an alternate configuration of the invention showing the upper frame separate from but attached to the lower frame by hinges and springs.
Figure 14:
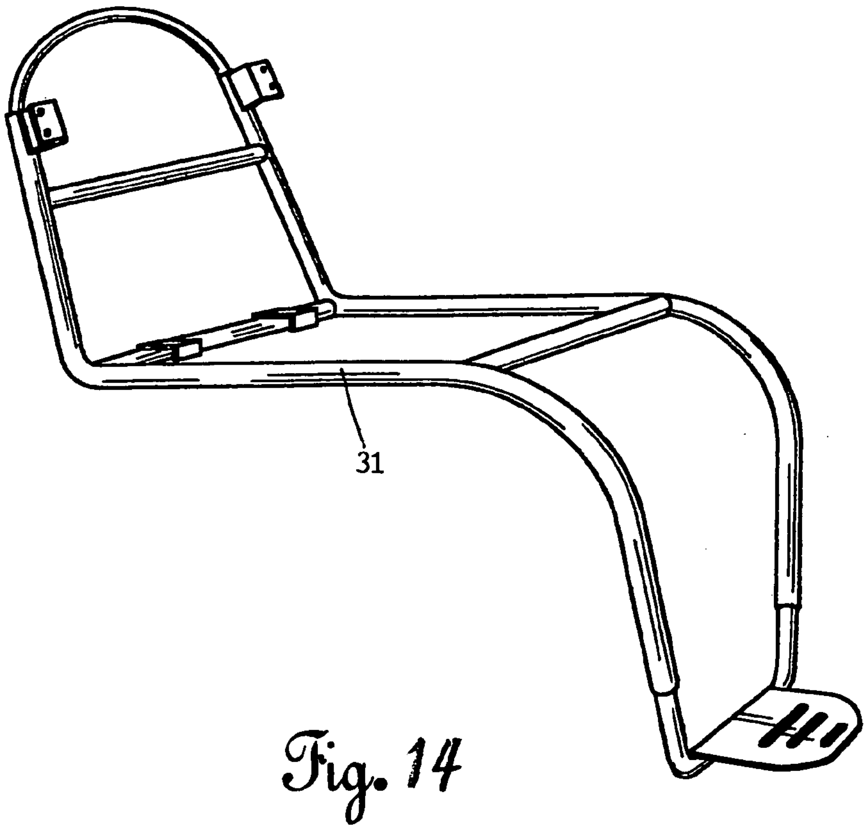
FIG. 14 is a front view of the upper frame showing the hinges and springs.
Figure 15:
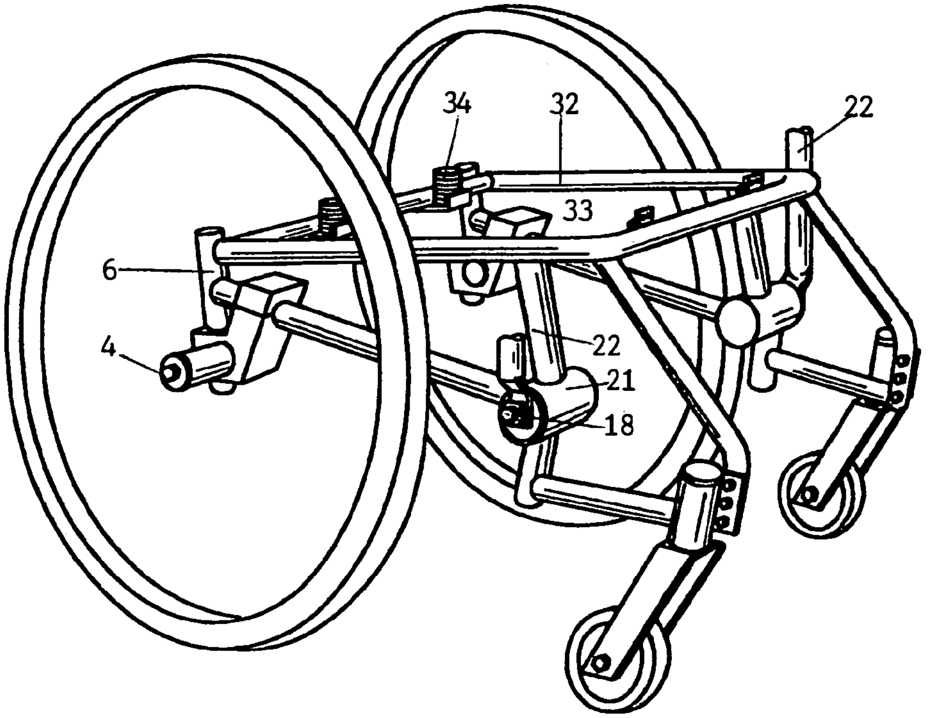
FIG. 15 is a front view of the lower frame showing the hinges and springs.
Figure 16:
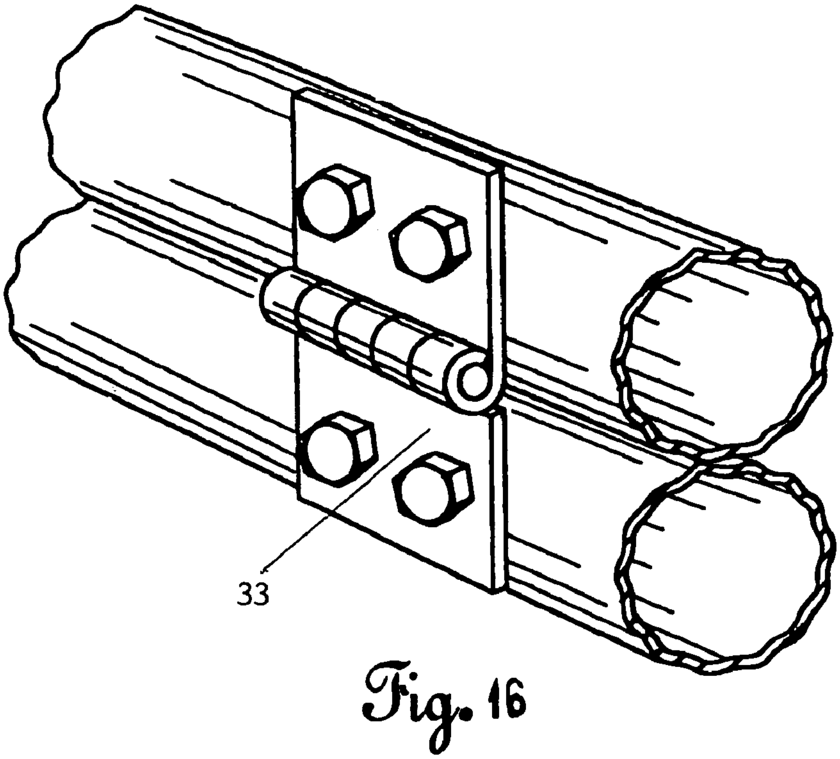
FIG. 16 is a view of one of the hinges attaching the upper and lower frames.
Figure 17:
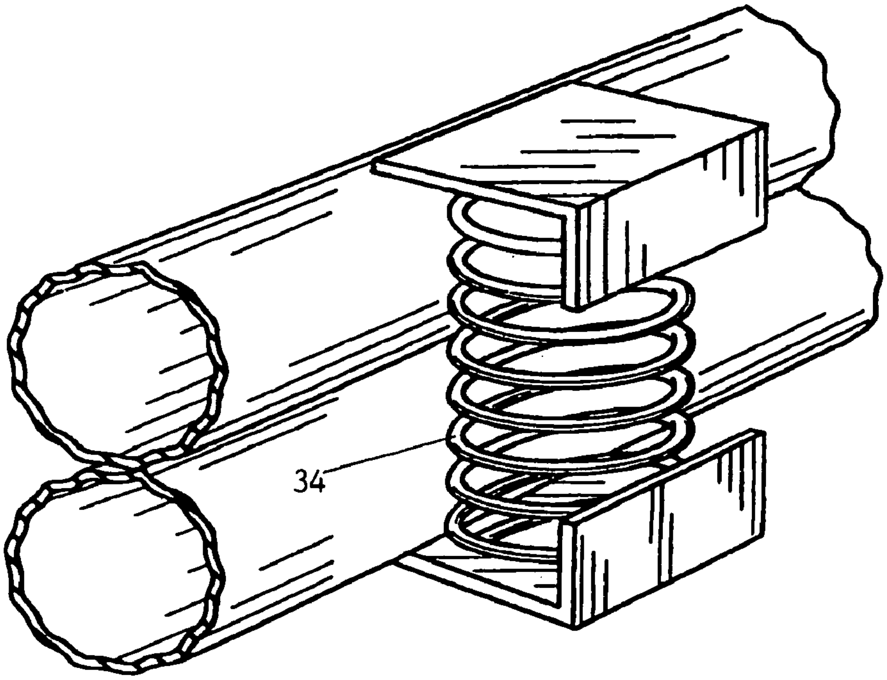
FIG. 17 is a view of one of the springs attaching the upper and lower frames.

With the forward drive gear engaged, a forward thrust on the push-pull lever activates the drive gear, the chain, the rear wheel sprocket, and the wheel in a forward direction; but pulling back on the lever to the starting position has no effect on motion because the forward drive gear has an internal ratchet mechanism FIG. 12 that prevents it from transmitting power in the reverse direction. Likewise, the reverse drive gear is a mirror image of the forward drive gear and only transmits power in the reverse direction and then only when it is engaged by the direction selector. When neither drive gear is engaged, no power can be transmitted to the rear wheels and all drive gears, mounted on bearings to the front drive axles, rotate passively.

Each derailer moves it drive chain between gear sprockets (12) when the shift cables (24) are tightened or relaxed. The user does this by pushing or pulling on the shifters (25) mounted at the ends of left and right push levers. These shifters are typically attached to the handles of each push lever so that the user can operate them with thumb and index fingers. The derailer and shifter on the left side of the chair FIG. (2,3) are typical of those commonly found on a ten-speed bicycle. The derailer and shifter on the right side of the chair are typically exactly backwards (mirror images) of those on the left side. This allows the user to perform analogous movements with each hand simultaneously to activate each derailer equally and to shift both left and right gears equally.

Each rear wheel has its own cable activated disc brake or caliper brake (26). The brakes are typically mounted on the frame adjacent to the rear wheel, and activated by a brake cable (27). The proximal end of each brake cable is attached to a left or right brake lever (28) which is mounted on the corresponding push lever handle. The user squeezes the brake levers to apply a braking force to the rear wheels. Each wheel brake is operated independently, as is each rear drive wheel. Each push lever is fitted with a pivotable retaining clip (29) to hold the brake lever in the compressed position, thereby maintaining the brake tightly compressed to the wheel, thus functioning as a parking brake.

The rear axles are fitted with standard bicycle wheels. These wheels are secured to the drive axles in a manner that prevents them from turning independently from the rear axles.

With reference to FIG. 13-17, it is seen that an alternate configuration to the wheelchair can be made with a two part frame, an upper frame (31) and a lower frame (32). These are attached to each other by hinges (33) in the front and by springs (34) in the back.

With this configuration, all the drive mechanisms and the wheels are incorporated in the lower frame. The upper frame is the mounting surface for the foot rest, the seat, and the back rest. This configuration allows for the two frame parts to be securely attached to each other; while the upper frame can move in a rocking manner, pivoting on the front hinges and dampened by the shock-absorbing effect of the rear springs. This allows for a smoother ride for the user over rough terrain or high speeds. It also allows for a single lower frame to be fitted with alternate seating arrangements for different size users.

Terms such as "left," "right," "up," "down," "bottom," "top," "front," "back,""in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

The invention claimed is:

1. A wheelchair having a frame, a seat, a pair of front wheels, and a pair of rear wheels, the wheelchair including:

two push-pull levers, each having a near end and a removed end and each rotatably mounted at the removed end to the frame of the wheelchair;

power transmission operating on each push-pull lever to convert movement of said push-pull levers to rotary motion;

forward and reverse drive sprockets for engagement with the power transmission of each push-pull lever, the drive sprockets rotatably attached to the wheelchair;

forward and reverse sprocket gears attached to each rear wheel; two chains for engaging the forward drive gears to the forward drive sprockets; and two chains for engaging the reverse drive gears to the reverse drive sprockets; two derailers for moving the chains from one of the multiplicity of forward drive sprockets to another of the multiplicity of the forward drive sprockets.

2. The wheelchair of claim 1, wherein each of said power transmission further includes a directional selector mechanism mounted on the front drive axle and designed to engage the forward drive gear or the reverse drive gear, or to disengage both drive gears resulting in a neutral drive position so that movement of the push-pull lever will propel the wheelchair either forward, or backward, or not at all.

3. The wheelchair of claim 2, wherein each directional control mechanism includes selector controller attached to the near end of the push-pull lever to change said direction control mechanism.

4. The wheelchair of claim 3, wherein each directional selector control mechanism includes a rotatable handle to change said selector mechanism between forward, neutral, and reverse.

5. The wheelchair of claim 1 further including a pair of independently acting brakes, said pair for operating on the rear wheels, said brakes further including brake controller the brake controller located on the near end of said push-pull lever.

6. The wheelchair of claim 5 further including means to retain the brake controller to lock the brakes to the wheels while the operator's hands are removed from the brake controller.

7. The wheelchair of claim 1, wherein each of said derailers includes a derailer controller mounted on the near end of said push-pull lever and further including a cable engaging the derailer controller and the derailer.

8. The wheelchair of claim 3 further including a pair of brakes and a pair of brake controller on each push-pull lever and further including derailer controller on each rear wheel, wherein said brake controller, derailer controller, and directional selector mechanism controller are located on the near end of the levers such that brake, directional selector and derailer controls can be effected by the user without removing his hands from the push-pull levers.

9. The wheelchair of claim 1 further including a pair of drive sprocket shields to protect the user's legs.

* * * * *